Nov. 1, 1955      W. F. CARR      2,722,396
ROTARY ACTUATOR HAVING MATCHED OUTPUT
Filed Dec. 4, 1950      2 Sheets-Sheet 1
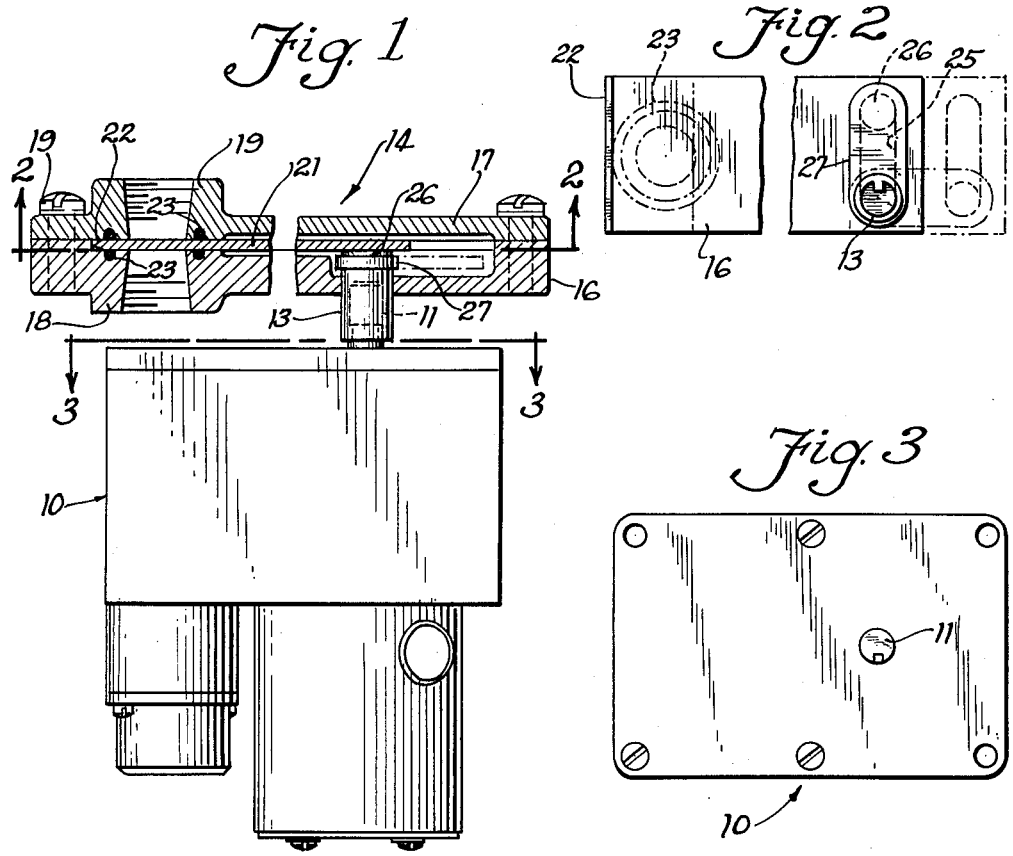
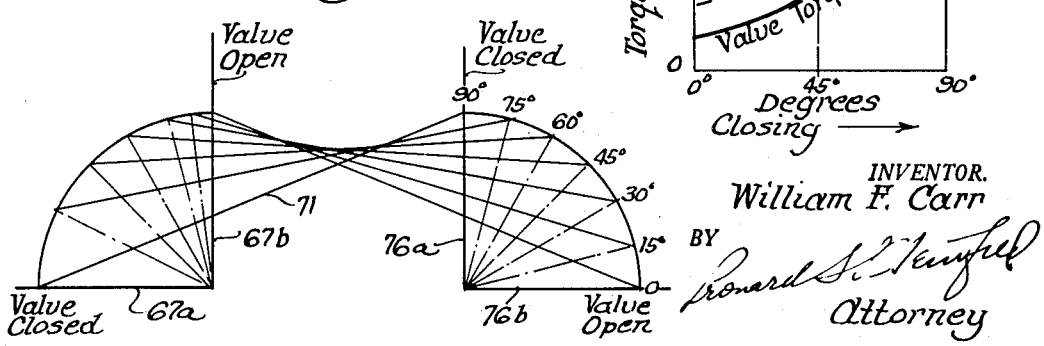
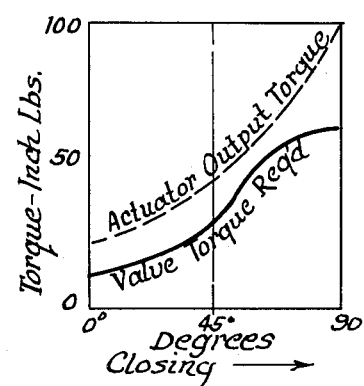
INVENTOR.
William F. Carr
BY
Attorney Nov. 1, 1955   W. F. CARR   2,722,396
ROTARY ACTUATOR HAVING MATCHED OUTPUT
Filed Dec. 4, 1950   2 Sheets-Sheet 2

INVENTOR.
William F. Carr
BY
Attorney

United States Patent Office 2,722,396
Patented Nov. 1, 1955

2,722,396

ROTARY ACTUATOR HAVING MATCHED OUTPUT

William F. Carr, Grand Rapids, Mich., assignor to Lear, Incorporated, Grand Rapids, Mich.

Application December 4, 1950, Serial No. 199,073

1 Claim. (Cl. 251—81)

This invention relates to a rotary actuator. Specifically it has reference to an actuator deriving input power from an electric motor or other prime mover and delivering output torque to a rotary shaft adapted for coupling to an actuated member. In a prime aspect the invention is particularly adapted to provide an output torque having predetermined characteristics.

For use in initiating and interrupting flow of fuel in aircraft a gate type of valve is generally employed. One design of such valve comprises a slidable gate which, on being moved to closed position, is forced between a pair of opposed resilient members. For example, such gate may be provided with an entering knife edge arranged to be forced between a pair of juxtaposed rubber rings, e. g. O rings. The operating characteristics of a valve of this sort are such as to require a low value of output torque on the part of the actuator which operates the valve during the initial portion of the closing cycle, and a substantially increased torque as the cycle progresses, due principally to the increased friction encountered as the gate progressively advances to its full position between the rubber rings. During the opening of the valve the initial torque required is high and diminishes as the gate approaches full open position. Furthermore the speed of the gate on closing may be highest initially and will diminish gradually as the gate approaches the end of its stroke, thereby eliminating ram effects in the fluid lines. Additionally in aircraft applications, and for emergency reasons, an extremely short closing time is specified, i. e., one second or less, and such almost instantaneous action must be provided without shock to the parts or ram effects.

Accordingly a principal object of the invention is the provision of a rotary actuator which is capable of initial low output torque at high speed and final high output torque at low speed.

Other objects are to provide an actuator as aforesaid which shall be compact, inexpensive, of low weight, and adaptable to various somewhat related applications with little or no change in its construction.

While the invention will be described in connection with the operation of a valve of a particular type employed for fuel lines in aircraft, it will be understood that it is of broad application in cases where the torque and speed requirements fall within the available range of the invention device, e. g., for pneumatic and hydraulic valves, for controlling hot air ducts, and so forth.

One of the important advantages of the invention lies in what may be termed a "matched output" feature, in that maximum output torque is developed only during the maximum load portion of the cycle, thereby resulting in high efficiency. Furthermore the unit incorporates an adjustable slipping type of disc clutch which will accommodate possible surge loads in a hydraulic system.

It will be recognized that an important requirement in aircraft applications particularly, is utmost reliability. For example, one specification requires that a hard aluminum alloy wire of 0.020" diameter be sheared off if placed in the path of the valve gate thereby to insure that accidentally positioned obstructions of this character may not prevent positive closing of the valve.

In the drawings which show a preferred embodiment of the invention:

Fig. 1 shows a side elevational view of the actuator and a cross section of a typical valve which the actuator is adapted to operate;

Fig. 2 is a cross section of the valve taken on the line 2—2 of Fig. 1, to show the gate and its operating means;

Fig. 3 is a plan view of the actuator taken on the line 3—3 of Fig. 1;

Fig. 6 is a diagram to indicate the functioning of part of the actuator mechanism; and Fig. 7 is a graph to illustrate the required and the realized output torque for a particular embodiment of the invention.

Figure 5:
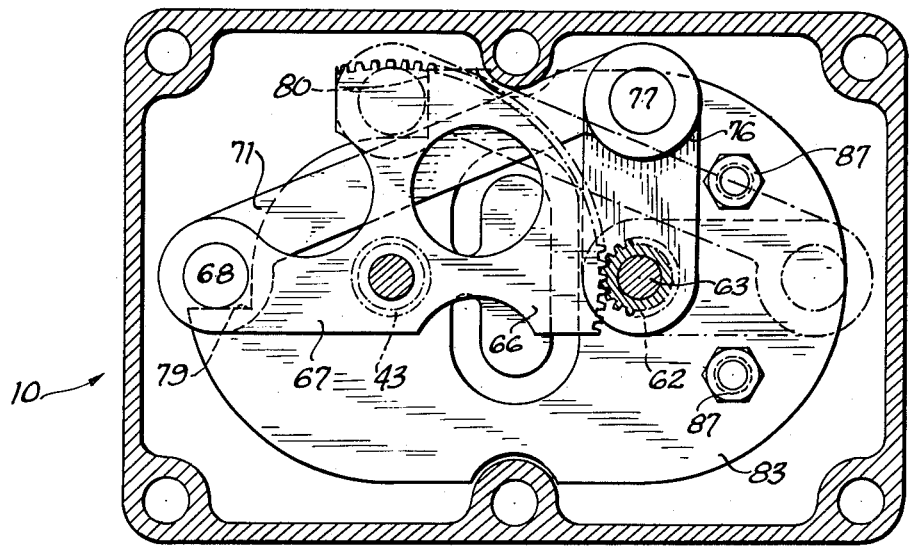
Fig. 5 is a cross section taken on the line 5—5 of Fig. 4.

Broadly regarded the invention comprises a power source, such as an electric motor, driving a slip clutch, the output of this latter being reduced in speed and arranged to rotate a crank arm through a right angle. The rotatable driven member is likewise provided with a crank arm which, in the respective initial and final positions of the crank arms, is disposed perpendicularly to the first crank arm. A link connects the extremities of the two crank arms. Thus rotation of the driving crank arm at a constant rate will impart the desired torque and speed to the driven arm, and in a manner to be pointed out.

Turning to the drawings the actuator 10 has an output shaft 11 connected by means of a key or splines to the input shaft 13 of a valve 14. This valve, shown as exemplificative only, comprises a bottom casing part 16 and an upper casing part 17, defining space for the reception of the movable valve components, and secured together by screws 19. Each part 16 and 17 is provided with a threaded boss 18 and 19 respectively to receive pipes forming the inlet and outlet of the valve. Closing or opening of the passage between inlet and outlet is effected by a gate 21 slidable longitudinally in the casing and having a knife edge 22 adapted to be forced between, or withdrawn from, the two rubber O rings 23—23 to furnish, when in closed position, a tightly closed barrier between the inlet and outlet.

Referring to Fig. 2 the gate 16 is shown as provided with a transverse slot 25 with which a crank pin 26 is slidably engaged. Pin 26 is carried at one end of a crank arm 27 secured to shaft 13. Consequently rotation of the arm 27 through an angle of 90° will close or open the valve, or vice versa, the closed position being shown in full lines and the open position in phantom.

Figure 4:
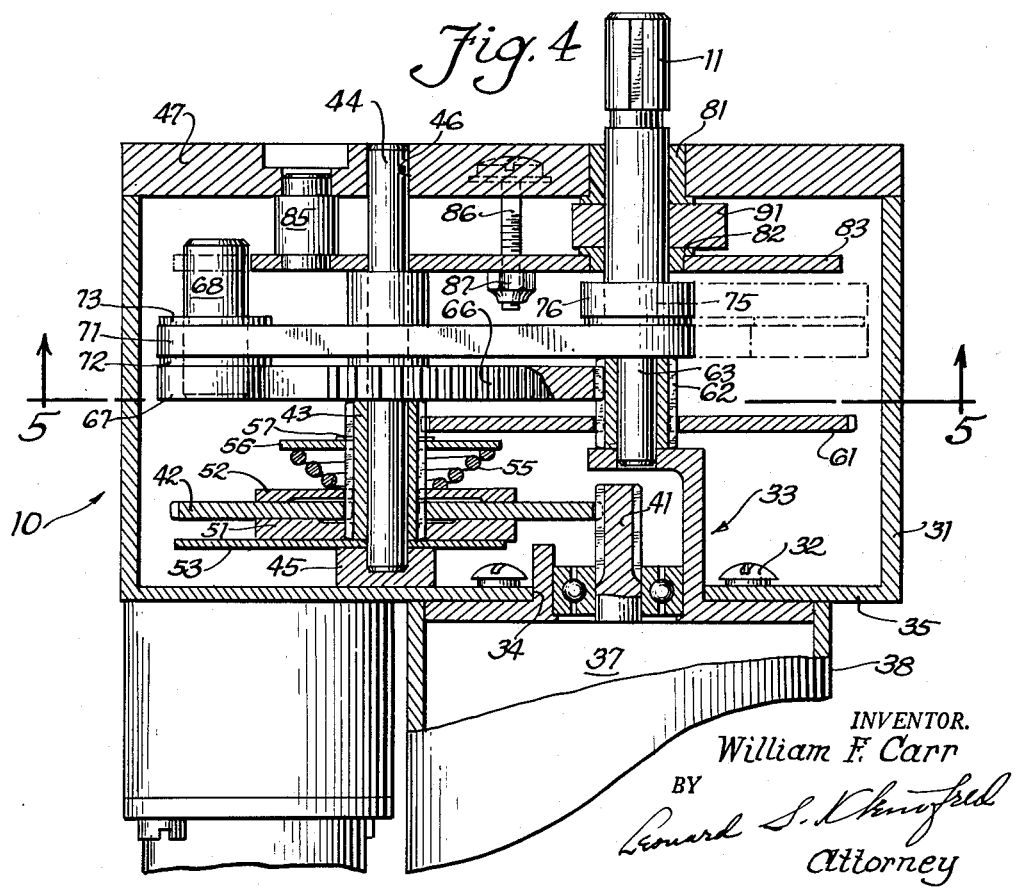
Fig. 4 is a vertical cross sectional view substantially medially of the unit.

In Figs. 4 and 5 are shown details of the actuator. A housing 31 carries, by means of screws 32, a bracket 33, this latter extending in part through an aperture 34 in the floor 35 of the housing. An electric motor 37 is carried in a housing 38 which is, in turn, secured to the bracket 33 by means not shown. The motor output shaft constitutes a pinion 41 in mesh with a gear 42 arranged for rotation with respect to a pinion 43. Pinion 43 is freely rotatable on a fixed shaft 44 held in a boss 45 of the floor 35 and in an aperture 46 in the cover 47 of the housing 31.

Positioned above and below the gear 42 are clutch discs 51 and 52 frictionally engaging the gear 42, the discs being united with the pinion 43 for joint rotation thereof, and supported on a fixed plate 53 to maintain the same against wobble. Pressure to force the discs 51 and 52 and gear 42 into frictional engagement is provided by a spring 55 backed by a plate 56 in turn retained by a snap ring 57 engaged in a groove of the pinion 43. Thus rotation of the motor may drive the gear 42 and, through the medium of the clutch comprising discs 51 and 52 and spring 56, the pinion 43. It will be apparent that any torque tending to overload the pinion 43 will cause the clutch to slip.

Pinion 43 is in mesh with a gear 61 united with a pinion 62 by pressing the two together, and is freely rotatable on a portion 63 of the actuator output shaft 11, this latter being journalled at its lower end in the bracket 33.

Also rotatable on the shaft 44 is a gear sector 66 in mesh with the pinion 62. A crank arm 67 is made integral with the sector 66 whereby rotation of the sector carried with it the arm 67. A stud 68 is affixed to the free end of the arm 67 and is pivotally associated with one end of a connecting link 71, a washer 72 absorbing some friction at the lower side of the link, and a snap ring 73 fitted into a groove in the stud 68 serving to maintain operative position of the link.

Attached to shaft 11, as by an aperture and flat 75, is a second crank arm 76, this latter having at its free end a fixed stud 77 pivotally associated with the other extremity of the link 71. Accordingly swinging movement of crank arm 67 is effective, through the link 71, to impart swinging movement to the arm 76, and hence the output shaft 11. It will be noted that in their respective initial and final positions the arms 67 and 76 are positioned at an angle of 90°.

Shaft 11 is further supported in bearing bushings 81 and 82 respectively carried in cover 47 and in an intermediate support plate 83. Plate 83 is positioned rigidly with respect to cover 47 by means of several studs 85 (only one being shown) and is attached by means of screws 86 and nuts 87. If desired shaft 11 may also have keyed thereto a cam 91 for operation of electrical limit switches (not shown) and as is well known in the actuator art.

By virtue of the linkage shown in Fig. 2 a 90° rotation of shaft 11 is required for operation of the valve through either its closing or opening cycles, and, by virtue of the construction described, a 90° rotation of the crank arms 67 and 76 will provide such degree of actuation, and in the manner described.

Support plate 83 is notched as indicated to define a pair of shoulders 79 and 80 against which the stud 68 may abut in its two extreme positions, and thereby to limit positively the range of movement of the crank arm 67. When either such stopped position is reached one or the other of the limit switches (not shown) will be actuated by the cam 91 to interrupt the current to the motor.

Referring now to Fig. 6, and assuming that the valve is in closed position as shown, the crank arms 67 and 76 are indicated schematically in their respective extreme positions as at 67a, 67b and 76a, 76b. It will be understood that motor 37 is reversible, and, in aircraft installations, is generally operated on direct current fed to either of two field windings selectively. Hence energization of one field or the other by means of a suitable switch is instrumental in causing rotation of sector 66 in a clockwise or anti-clockwise sense. With the valve in closed position and remembering that clockwise rotation of the shaft 11 (viewed from below) will effect opening of the valve it will be noted that Fig. 6 indicates schematically the relative positions of the arms as 67a and 76a as they will be at closed position of the valve and as 67b and 76b at the open position thereof. Torque derivable from arm 67 at initial opening is seen to result from the relatively shorter moment arm of crank 67 as compared to the moment arm of the crank 76, and the initial torque supplied to arm 76 will therefore be multiplied in that ratio. Subsequently and during the rotation of arm 67 from its position 67a to 67b the arm 76 will be rotated from its position 76a to 76b, the torque being gradually diminished as full opening is reached and in proportion to the gradually increasing moment arm of the crank 67 and the gradually decreasing moment arm of the crank 76. Reversal of the cycle, i. e. from full open to full closed position constitutes merely a simple reversal of the foregoing. Moreover, by reason of the relative lengths of moment arms of the crank arms the speed of rotation of the actuator output shaft is relatively low at the beginning of the opening cycle or at the end of the closing cycle, but is relatively higher at the end of the opening cycle or at the beginning of the closing cycle, with a substantially linear increase or decrease of speed, as the case may be, between these extremes.

In Fig. 7 is shown a comparison between the curves of the torque required to actuate the valve in the specified manner and the torque output of an actuator constructed in accordance with the invention. It will be observed that the performance curve rises from full open position (0°) to full closed position (90°) at a rate corresponding favorably with the specification, and that moreover the available torque is in excess of the specification.

While I have shown a particular embodiment of my invention, it will be understood, of course, that I do not wish to be limited thereto since many modifications may be made, and I therefore contemplate by the appended claim to cover any such modifications as fall within the true spirit and scope of my invention.

Having thus described my invention, what I claim and desire to secure by Letters Patent is:

In a power operated valve of the type wherein a gate is arranged for movement transversely to the fluid conduit, the improvement comprising a rotary power source, a crank arm rotatable by said source, an output crank arm having a connection for engagement with the gate for reciprocating the same, a link pivoted at its ends to the respective free end of each said arm, said arms being of the same effective length and both arranged for rotation over a maximum angle of 90°, stop means abuttable by at least one of said arms to define the said range of angular movement whereby the arms in their two extreme stopped positions are 90° displaced angularly, and slipping clutch means between said source of power and first crank arm for relieving excess torque upon abutment of said one of said arms with its said stop means whereby upon inception of closing movement of the gate minimum torque is applied and upon full closing thereof maximum torque is applied.

References Cited in the file of this patent
UNITED STATES PATENTS

| | | |
|---|---|---|
| 892,116 | Becker | June 30, 1908 |
| 1,137,401 | Haymond | Apr. 27, 1915 |
| 1,376,315 | Brigendine | Apr. 26, 1921 |
| 1,957,428 | Brenneman | May 8, 1934 |
| 1,990,090 | Packard | Feb. 5, 1935 |
| 2,080,465 | Ells | May 18, 1937 |
| 2,276,702 | Riparbelli et al. | Mar. 17, 1942 |
| 2,395,768 | Svoboda | Feb. 26, 1946 |
| 2,582,326 | Gussow | Jan. 15, 1952 |

OTHER REFERENCES

Ingenious Mechanisms, vol. II, published 1936, pp. 386–390.